United States Patent
Tietjen

(10) Patent No.: US 7,423,578 B1
(45) Date of Patent: Sep. 9, 2008

(54) SPLIT APERTURE ARRAY FOR INCREASED SHORT RANGE TARGET COVERAGE

(75) Inventor: Byron W. Tietjen, Baldwinsville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1 day.

(21) Appl. No.: 11/450,498

(22) Filed: Jun. 9, 2006

(51) Int. Cl.
*G01S 13/00* (2006.01)

(52) U.S. Cl. .............................. 342/59; 342/81; 342/83; 342/157; 343/725

(58) Field of Classification Search .............. 342/81, 342/27, 59, 83, 157, 394, 368–377, 442; 343/725, 751, 770
See application file for complete search history.

(56) References Cited

U.S. PATENT DOCUMENTS

| 4,649,388 | A | * | 3/1987 | Atlas | 342/26 D |
| 4,792,805 | A | * | 12/1988 | Miglia | 342/372 |
| 6,084,540 | A | | 7/2000 | Yu | |
| 6,084,545 | A | | 7/2000 | Lier et al. | |
| 6,163,296 | A | | 12/2000 | Lier et al. | |
| 6,255,981 | B1 | * | 7/2001 | Samaniego | 342/25 R |
| 6,356,233 | B1 | | 3/2002 | Miller et al. | |
| 6,891,511 | B1 | | 5/2005 | Angelucci | |
| 7,180,447 | B1 | * | 2/2007 | Jacomb-Hood | 342/374 |
| 2007/0001897 | A1 | * | 1/2007 | Alland | 342/70 |

\* cited by examiner

*Primary Examiner*—Timothy A Brainard
(74) *Attorney, Agent, or Firm*—Howard IP Law Group, PC

(57) ABSTRACT

A phased array radar system comprising a plurality of radiating elements configured in a common array aperture for detecting and tracking targets; and a transmit and receive arrangement responsive to a first control signal for configuring the plurality of radiating elements to define a plurality of sub-apertures from the common array aperture for detecting and tracking short range targets, wherein the plurality of sub-apertures are independently steerable array apertures.

11 Claims, 4 Drawing Sheets

SPLIT APERTURE ARRAY FOR INCREASED SHORT RANGE TARGET COVERAGE

FIELD OF INVENTION

The present invention relates generally to radar systems and more specifically to a system and method for enabling short range array antenna coverage without significantly impacting long range performance.

BACKGROUND

The detection and tracking of a target object or objects is typically accomplished with radio detection and ranging, commonly known as radar. Radar systems typically emit electromagnetic energy and detect the reflection of that energy scattered by a target object. By analyzing the time difference of arrival, Doppler shift, and various other changes in the reflected energy, the location and movement of the target object can be calculated. Phased array antenna systems employ a plurality of individual antenna elements or subarrays of antenna elements that are separately excited to cumulatively produce a transmitted electromagnetic wave that is highly directional. The radiated energy from each of the individual antenna elements or subarrays is of a different phase, respectively, so that an equiphase beam front or cumulative wave front of electromagnetic energy radiating from all of the antenna elements in the array travels in a selected direction. The differences in phase or timing among the antenna activating signals determines the direction in which the cumulative beam from all of the individual antenna elements is transmitted. Analysis of the phases of return beams of electromagnetic energy detected by the individual antennas in the array similarly allows determination of the direction from which a return beam arrives. Such processing as described above is well known to those of ordinary skill in the art.

A pulse based radar system scans a field of view and emits timed pulses of energy. Such radar systems, including, for example, CTA type radar systems, can require both short range and long range target detection and tracking. Long range (e.g. on the order of 60 kilometers (Km) or more) detection performance requires relatively long pulse repetition intervals (PRI). A narrow beam is typically required for long range target detection and tracking.

A conventional radar array having a plurality of radiating elements 100 configured to define an array aperture A for generating a narrow beam for long range detection and track performance is depicted in FIG. 1. The longer PRI reduces the probability of detecting high vertical velocity, shorter range targets (e.g. targets within about 15 Km). In order to alleviate this problem, systems may utilize separate short range (SR) and long range (LR) pulses in an attempt to cover all target ranges. However, even with SR pulses, significant limitations exist in conventional radar systems processing and implementation.

For example, short range detection and localization performance of conventional radar systems is typically not limited by target signal-to-noise ratio (SNR), but rather by the number of look opportunities of the target by the radar. This number is limited by such factors as high target vertical velocities, elevation beamwidth, and target revisit rate. More specifically, short range target detection and localization is usually not a function of SNR, because such short range targets typically have SNRs well in excess of typical threshold detection levels. However, the problem lies with the number of look opportunities with which to detect, track and localize a target with sufficient accuracy to evaluate a projectile launch or impact point. A radar system utilizing a narrow beam long range pulse for detecting and tracking targets may operate quite effectively for long range objects; however, such a system may be inadequate to track short range objects having high target vertical velocities, which require much greater processing and response time, but which does not require such narrow beam(s). Alternative techniques for detecting and tracking both long range and short range targets within a single radar system is desired.

SUMMARY OF THE INVENTION

The invention relies in part on recognition of the problem, and in providing a solution for enhancing short range target coverage without significantly impacting long range performance in a radar array system.

The invention takes advantage of the signal excess characteristic of short range targets to effectively increase the number of look opportunities for such short range targets.

According to an aspect of the present invention, a radar array having a plurality of configurable radiating elements, which plurality defines a common aperture A of the array, is electronically segmented or sectored into two independently steerable arrays, each having an aperture substantially half of the common aperture A. The two independently steerable arrays are configured vertically one on top of the other and processed separately in order to effectively double the elevation beamwidths in both the transmit and receive beams without the need to spoil the beam, while also doubling the number of beams that can be used, thereby effectively doubling the target revisit rate.

In one aspect of the invention, a phased array radar system having a plurality of radiating elements configured in a common array aperture of m×n elements comprises a controller responsive to a control signal for configuring a first subset of the elements of the common array aperture into a first sub-aperture for providing a first interrogating beam; and for configuring a second subset of the elements of the common array aperture distinct from the first subset, into a second sub-aperture for providing a second interrogating beam. Each of a pair of transmitters is coupled to a corresponding one of the first and second sub-arrays and responsive to the controller for generating the first and second interrogating beams, the beams being independently steerable. A pair of receiver beamformers, each coupled to a corresponding one of the first and second sub-arrays, provides beamformed output data indicative of target reflections from each of the first and second interrogating beams. A signal processor is responsive to the beamformed output data for determining target detection and tracking according to each sub-array.

According to another aspect, in a phased array radar system having a plurality of radiating elements configured in a common array aperture of m×n elements, a method for detecting and tracking targets comprises: electronically segmenting the common array aperture of m×n elements into a first sub-aperture comprising a first subset of the m×n elements defining a first sub-array, and a second sub-aperture comprising a second subset of the m×n elements distinct from the first subset defining a second sub-array; in a first mode, generating a first interrogating beam from the first sub-array, and a second interrogating beam from the second sub-array, the first and second interrogating beams differing in at least one of frequency, phase, and beam pointing direction; independently steering the first and second interrogating beams; receiving beamformed data from each of the first and second sub-apertures corresponding to the interrogating beams, and independently processing the beamformed data to provide target information for each of the first and second sub-apertures; and in a second mode, coherently operating the first and second sub-arrays to generate a narrowband interrogating beam of a given frequency; receiving beamformed data from each of the first and second sub-apertures corresponding to the narrowband interrogating beam, and combining the beamformed data to provide target information indicative of the full common array aperture.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts, and wherein.

DETAILED DESCRIPTION

It is to be understood that the figures and descriptions of the present invention have been simplified to illustrate elements that are relevant for a clear understanding, while eliminating, for the purpose of clarity, many other elements found in radar systems and methods of making and using the same. Those of ordinary skill in the art may recognize that other elements and/or steps may be desirable in implementing the present invention. However, because such elements and steps are well known in the art, and because they do not facilitate a better understanding of the present invention, a discussion of such elements and steps is not provided herein.

Figure 1A:
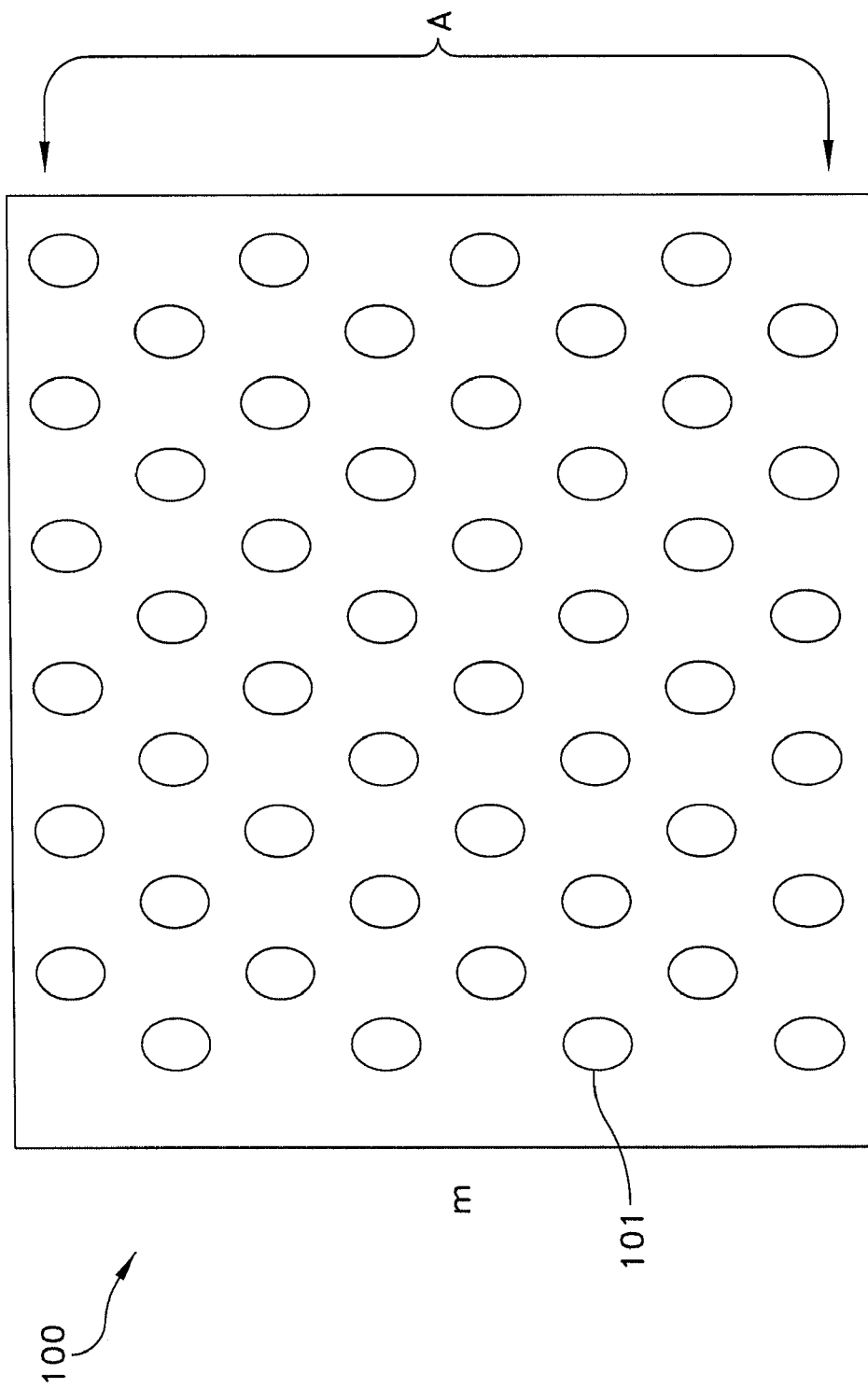
FIG. 1a is a front view of an aperture of a phased array antenna system.

Referring now to FIG. 1a, there is shown a front view of a phase array antenna system 100 having an aperture A shown by way of example and not limitation, and including a rectangular array of m×n antenna elements 101 arranged in rows and columns. The antenna elements are each associated with respective transmit/receive (T/R) modules (not shown). Such radiating elements may be dipoles, monopoles, and/or other such radiators as is understood in the art. Each T/R module or element provides the active transmit/receive electronics required to operate the antenna element in transmit and receive mode. In an exemplary embodiment, each T/R module comprises a circulator coupled to a variable attenuator or amplitude shifter via low noise receive amplifier. A phase shifter may be switchably coupled via a T/R switch to transmit to a high power amplifier or to a variable attenuator for operation in either a transmit or receive mode of operation. The phased array of antenna elements are configured in a regular, periodically spaced grid as illustrated in FIG. 1a.

It is understood that such a radar system is known in the art. Many such radar systems are known, including for example, the system as depicted in U.S. Pat. No. 6,084,540, entitled "Determination of Jammer Directions Using Multiple Antenna Beam Patterns" assigned to Lockheed Martin Corporation, the assignee herein, the subject matter thereof incorporated herein by reference. Therein, an array antenna receives antenna beam pattern control signals over a signal path, for controlling the beam pattern. Those skilled in the art know that the beam pattern of an array antenna can be controlled to produce one or more directed beams, which may be broad, or of the narrow band or "pencil" type. Since control of an array antenna does not involve moving any physical object, control of the beam direction can take place almost instantaneously. Consequently, multitudes of directional beams can be generated in sequence in a very short period of time. As an alternative, the antenna beam controls can be adjusted to simultaneously produce multiple directional beams. In FIG. 1 of U.S. Pat. No. 6,084,540, three representative beam patterns are illustrated, which point in different directions from the antenna, as might be desirable when tracking multiple radar targets. The directional patterns each include a plurality of sidelobes. Each sidelobe is separated from the adjacent sidelobe, and from any adjacent main lobe, by a null in the antenna or beam pattern.

Figure 2:
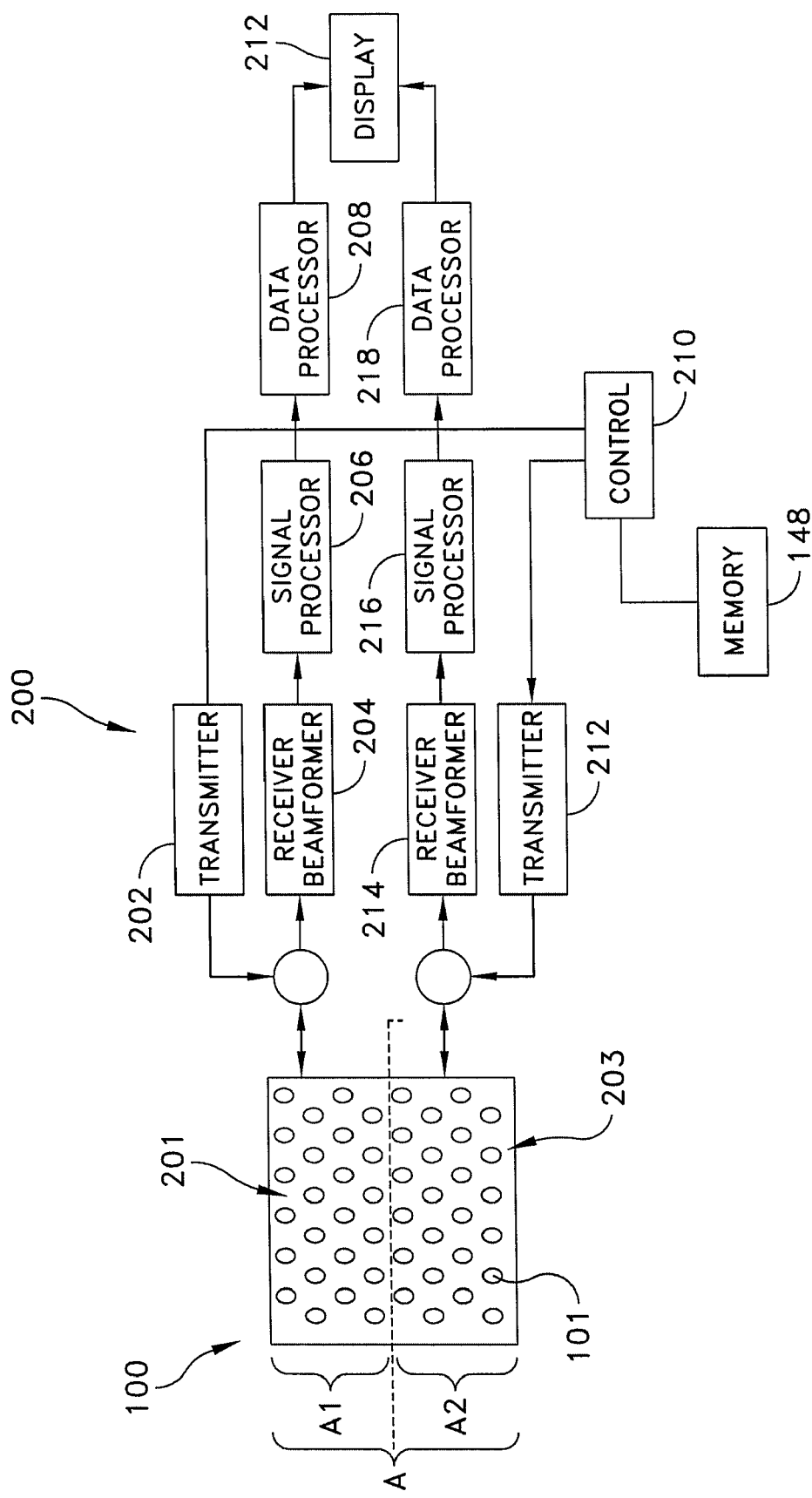
FIG. 2 is a simplified block diagram of a split aperture array configuration useful for short range target detection and tracking according to an embodiment of the present invention.

Referring now to FIG. 2, there is shown a block diagram of an exemplary split aperture array configuration 200 for short range target detection and tracking according to an embodiment of the present invention. As illustrated therein system control function module 210 includes processor control logic for generating array control commands for controlling transmit and receive functions of T/R modules or elements 101 in the phased array antenna assembly 100 on a per-element basis. In one embodiment, radar array 100 has a plurality of radiating elements 101 configured in a common array aperture A of m×n elements. When the system is to be operated in a short range detection/tracking mode, transmit control commands are generated from control processor 210 and are provided to each of a pair of transmit modules 202, 212 coupled to the array. Each transmit module (202, 212) includes waveform generator and exciter circuitry for electronically separating the common array aperture A of m×n elements into a first sub-aperture A1 comprising a first subset of the m×n elements, and a second sub-aperture A2 comprising a second subset of the m×n elements. In a preferred embodiment, waveform generator and exciter modules operate to split the array aperture A electronically into two sub arrays of aperture A1 and A2, one on top of the other, with A1 and A2 each equal to A/2. That is, sub aperture A1 defines a first subarray 201 of size m/2×n elements, and sub aperture A2 defines a second subarray 203 of size m/2×n elements. Of course, it is understood that each of the subarrays may be segmented into less than one half of the full aperture common array, according to the particular application, mode, and system requirements. The transmitter/exciter circuitry transmits signals to the phased array antenna assembly and hence to each of the subarrays for providing two independently steerable arrays. In a preferred embodiment, the split aperture short range mode provides for two simultaneous beams having twice the beamwidth as that of a single beam formed via the full array aperture A enabling an increase in short range coverage of about 4:1.

Figure 4:
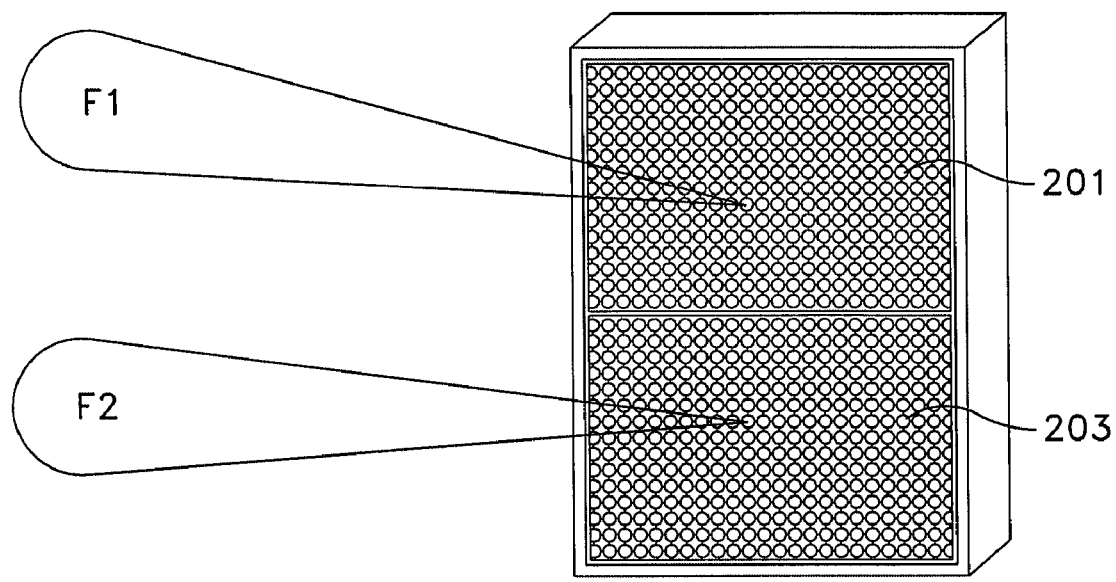
FIG. 4 is a schematic illustration of two electronically steerable arrays and associated beams corresponding to the embodiment of FIG. 2 useful for short range detection and tracking.

Referring now to FIG. 4 in conjunction with FIG. 2, in short range mode the system operates to provide two transmit beams F1, F2, respectively, from sub-arrays 201, 203 simultaneously for short range target detection and tracking. The transmit beams may be broader beams for increased elevation coverage for short range targets such as missiles or other projectiles. The widened beams in elevation are enabled by the high SNR margin associated with short range targets and may effectively increase coverage by a 2 to 1 ratio. In general, the transmit or interrogating beams differ in at least one of frequency, phase, and beam pointing direction, as controlled by the processor control logic 210. For short range (SR) pulse waveforms the number of search beams is effectively doubled, as twice as many beams effectively double the target revisit rate.

In an exemplary configuration, short range half aperture processing is accomplished using an SR pulse width of about 1 to 10 microseconds (us) with a PRI of about 40 to 100 us. The pulse widths and PRI for each of the beams of the dual apertures A1, A2, would each be of the same duration, but of different frequency and pointing direction, with transmission (and subsequent reception) occurring at the same times for each sub array. In other words, both transmit beams out from apertures A1, A2 would be output at the same time, and both receive beams would be received by the separate beamforming circuits at the same time.

Still referring to FIG. 2, for receive beam processing, reflected signal data is received via each of apertures A1 and A2 and separately processed by receiver circuitry modules 204, 214, respectively. Beamformer signal outputs from each sub-array are down converted via an RF downconverter arrangement, A/D converted into digital form, and applied separately to produce desired beams. The signals representing the various beams are applied to signal processor logic 206, 216 which performs target signal detection and location processing, weight calculations (including, e.g. adaptive weight calculations), antenna nulling, and other signal processing of the received waveforms as is understood by those of ordinary skill in the art. Signal processor logic may be operatively coupled to one or more memory units (not shown) for storing, retrieving and processing array information including calibration data in the form of mutual coupling coefficients, dynamic range and SNR data, transmit power and received signal strength, for example. The beamformer and signal processor modules may also include or be operatively coupled to signal detection circuitry and functionality for detecting and processing the transmitted/received signals, including detection of null conditions and threshold comparisons.

Control Processor 210 may also include or be operatively coupled to performance monitoring and fault detection circuitry for processing and identifying failed or degraded elements for later maintenance or replacement.

The output of signal processor modules 206, 216 are fed into data processor logic 208, 218, which operate to perform target detection and location processing of the target data associated with each of the sub apertures A1, A2, and fed to a display unit 220 for displaying the information to a user.

The beamformer receiver in general provides for the application of phase shifts to each element (via phase shifters), and then sums the result. Further filtering and analog to digital (A/D) conversion may also be included. The signal processor will operate on this digital data to further filter the signal as needed, perform pulse compression, Doppler filtering, magnitude detection, and thresholding for target detection as is well known to those skilled in the art. The data processor coupled to the signal processor will use this target detection data to form trackers which track the targets and determine target characteristics, such as trajectory, and launch and/or impact points as is well known to those skilled in the art. The control processor serves to coordinate the full and half aperture modes by providing the appropriate control functions to the array elements and the transmit/receive processing. This will include the proper phase shifts to each element during transmit and receive when transmitting and receiving the full aperture (long range) pulse or sub-aperture (short range) pulse as is understood by those skilled in the art.

The separately controlled arrays and separate receiver processing enable partial aperture (i.e. A1, A2) performance to be obtained. In a preferred embodiment, different transmit beam frequencies are utilized for each sub-aperture.

By splitting the array into two separate apertures, the system experiences a performance loss of about 9 dB. This results from about a 3 db loss from each of the widened transmit and receive beams, and a 3 dB loss in power. However, for short range targets, SNR is typically high due to the relatively short distances involved, thereby mitigating problems associated with power loss.

Figure 3:
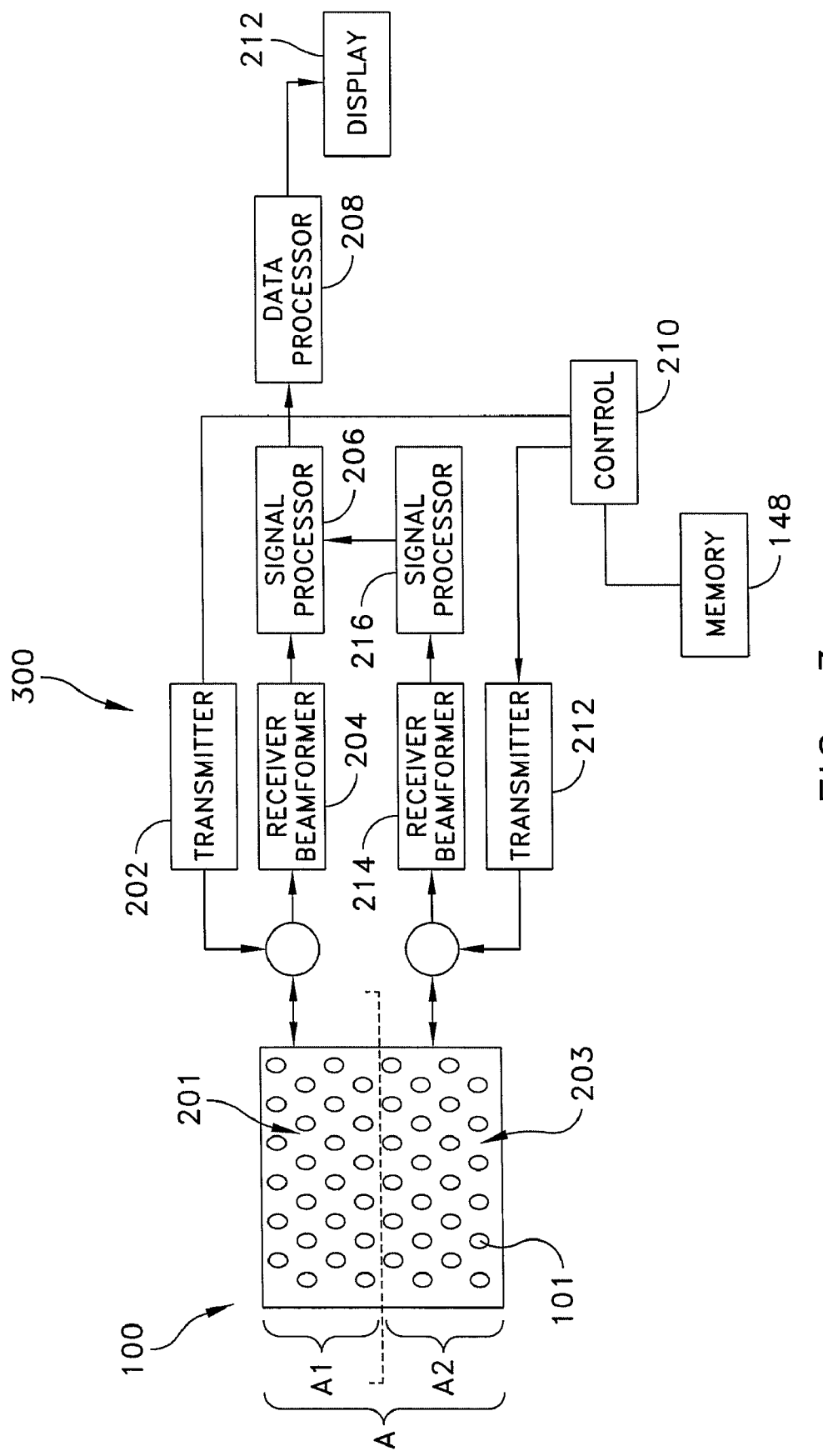
FIG. 3 is a simplified block diagram of a split aperture array configuration useful for long range target detection and tracking according to an embodiment of the present invention.

In accordance with another aspect of the present invention, for long range target detection and tracking, the two split aperture configuration can be used coherently to form a narrower beam for long range application without suffering long range performance degradation. FIG. 3 illustrates the configuration for operating the radar system of the present invention in a long range target detection and track mode. Like reference numerals depicted in FIG. 2 are used to indicate like parts. In long range mode, control module 210 operates to control each of the transmitters 202, 212 coherently to enable effectively full aperture (i.e. aperture A) performance.

Figure 5:
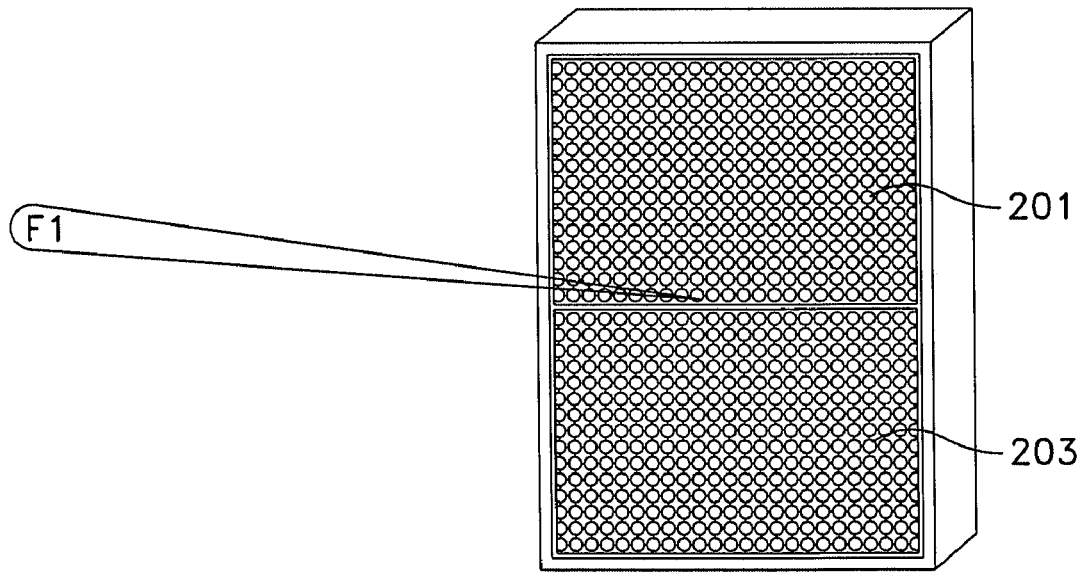
FIG. 5 is a schematic illustration of a narrow beam corresponding to the embodiment of FIG. 3 useful for long range detection and tracking.

In an exemplary embodiment, and referring now to FIG. 3 in conjunction with FIG. 5 in long range mode, signal data corresponding to the same frequency, phase and beam pointing direction is applied to both transmitter modules 202, 212 via controller 210 so that the interrogating beams output from each of apertures A1, A2 coherently form a narrow beam F3 (FIG. 5) for long range detection and track performance.

In an exemplary configuration, long range full aperture processing occurs using an LR pulse width of about 20 microseconds (us) or greater, with a PRI greater than about 200 us. The transmit beams may be generated using phase locked loops, or may be generated via direct digital conversion, for example. The transmitters are coherent in time and properly phased. A common clock or clock signal may operate to drive each of the separate transmitters such that the exciters are in lock step with one another. The exciter modules associated with each of the transmitters blocks 202, 212 are then activated simultaneously. The two exciter modules produce essentially the same waveforms which are controlled to the same phase, and the antenna elements are appropriately phased so that the apertures A1, A2 operate as a single full aperture A. It is understood that phasing of each of the antenna elements is within the skill of one of ordinary skill in the art, and further description is omitted for brevity. Similar operation occurs for the receive beam processing wherein the elements are phased and the output of each subarray is combined (e.g. added) to produce an output associated with a full array aperture A. Because the operation is a linear operation, the signal processing adds the output from each beamformer together to provide a received signal associated with the full array.

The long range (LR) pulse waveforms enable long range detection and tracking using the full aperture A of the phased array antenna. As in the short range mode, the reflected signal data is received via each of apertures A1 and A2 and separately processed by receiver circuitry modules 204, 214. Beamformer signal outputs from each sub-array are down converted via an RF downconverter arrangement, A/D converted into digital form, and applied separately to produce desired beams. The signals representing the various beams are then coherently combined from signal processor logic 206, 216 to form full aperture array beam signal and applied to data processor detector and tracking module 208. The output of data processor 208 is fed to a display unit 220 for displaying the information to a user.

As identified in FIGS. 2 and 3, processor 210 operates in conjunction with memory 148 which comprises an operating system that contains the various execution commands necessary to control the array hardware/software and its operation. In addition, the processor and memory include functionality selection adapted to automatically select or transition to a given mode of operation in response to a control signal or user input, and perform the processing steps associated with the long range and short range techniques described herein.

Furthermore, it is understood that the control processor implementing one of long range or short range waveform and target detection/tracking may switchably couple to the signal processor arrangement as depicted in FIG. 3 for coherently combining the beamformer output data to provide full aperture array data according to a first switch position (S1), or decouple the signal processor arrangement as depicted in FIG. 2 for separate parallel processing of the beamformer output data to provide partial aperture data via a second switch position (S2). Such switching or reconfiguration may be embodied as one or more mechanical, electrical, software, or logically related switching functions associated with configuring the antenna system according to the required operational mode of the array.

The processor, memory and operating system with functionality selection capabilities can be implemented in software, hardware, firmware, or a combination thereof. In a preferred embodiment, the processor functionality selection is implemented in software stored in the memory. It is to be appreciated that, where the functionality selection is implemented in either software, firmware, or both, the processing instructions can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

Further, it is understood that the subject invention may reside in the program storage medium that constrains operation of the associated processors(s), and in the method steps that are undertaken by cooperative operation of the processor(s) on the messages within the communications network. These processes may exist in a variety of forms having elements that are more or less active or passive. For example, they exist as software program(s) comprised of program instructions in source code or object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a computer system hosting or running the computer program may be configured to access, including signals downloaded through the Internet or other networks. Examples of the foregoing include distribution of the program(s) on a CD ROM or via Internet download.

The same is true of computer networks in general. In the form of processes and apparatus implemented by digital processors, the associated programming medium and computer program code is loaded into and executed by a processor, or may be referenced by a processor that is otherwise programmed, so as to constrain operations of the processor and/or other peripheral elements that cooperate with the processor. Due to such programming, the processor or computer becomes an apparatus that practices the method of the invention as well as an embodiment thereof. When implemented on a general-purpose processor, the computer program code segments configure the processor to create specific logic circuits. Such variations in the nature of the program carrying medium, and in the different configurations by which computational and control and switching elements can be coupled operationally, are all within the scope of the present invention.

As shown and described herein, the present invention provides for long range detection and localization performance of a full aperture array A while providing a 4:1 increase in target coverage for short range targets or projectiles. The present invention takes advantage of the SNR margin for short range targets and widens transmit and receive beams in elevation to increase coverage by 2:1 in short range mode, while doubling the number of search beams for short range waveforms, thereby quadrupling short range target coverage. By implementing the split aperture parallel processing configuration and SR waveform pulses for short range detection/track, and long range coherent narrow band single beam processing configuration for LR waveform pulses and long range detection/track, baseline templates are not impacted, while providing twice the number of short range beams in the same amount of time. The increased coverage for SR targets will also allow more track-while-scan processing to avoid impact to the timeline by reducing the number of dedicated track beams necessary to verify/track targets.

By way of example only, a radar system embodying the principles of the present invention may be operated as follows. A series of: (a) eight SR beam transmission bursts are sequenced at given time intervals at given azimuths, followed by: (b) a single LR beam transmission at a given azimuth. The sector to be scanned is then swept by repetitive processing of the above steps (a) and (b) until the entire sector (e.g. +/−45 degrees) is scanned. Each of the SR beam transmission sequences consists of simultaneous transmissions of an SR pulse of a given PRI from each exciter in transmitter 202 and transmitter 212, respectively, followed by subsequent simultaneous receiver beamforming reception via beamformers 204, 214, respectively (and subsequent signal and data processing) for partial array aperture processing associated with each SR beam. Each LR beam transmission consists of an LR pulse of a given PRI simultaneously and coherently transmitted by each of transmitters 202, 212, to effectively form a single narrow beam, followed by subsequent simultaneous receiver beamforming reception via beamformers 204, 214, respectively (and subsequent signal and data processing) for full aperture array processing. This 8 SR/1 LR sequencing, system configuration and processing, continues until the entire sector is scanned. In this manner, both LR and SR targets are detected, tracked and localized within a single radar having a common array aperture. Of course, other sequencing and repetition rates are contemplated.

The present invention finds application in various radar array systems and subsystems, including, for example, CTA-type radar systems and counter-fire radars that provide or require simultaneous long and short range capabilities.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A plurality of radiating elements configured in a common array aperture for detecting and tracking targets in a long range mode or a short range mode of operation; a control processor operatively coupled to a pair of exciter and receiver arrangements coupled in parallel to said array, said control processor responsive to a control signal for configuring said plurality of radiating elements to define a pair of sub-apertures from said common array aperture for detecting and tracking targets, wherein said pair of sub-apertures are each independently steerable array apertures, each subaperture communicating with a respective one of said pair of exciter and receiver arrangements;

wherein said short range mode, each of said exciter pairs is responsive to a corresponding pulse waveform to form separate beams from said subapertures differing in at least one of frequency, phase, and beam pointing direction;

wherein in said long range mode, each of said exciter pairs is responsive to a corresponding pulse waveform of the same frequency, phase, and beam pointing direction to coherently combine signal data to form a single narrowband beam from said subapertures.

2. The system of claim 1, wherein in said short range mode said pair of sub-apertures comprises a first aperture for providing a beam at a first frequency, and a second aperture for providing a beam at a second frequency.

3. The system of claim 1, further comprising a display for displaying output data associated with said detected and tracked short range targets.

4. The system of claim 1, wherein said short range target distance is less than about 15 kilometers.

5. A phased array radar system having a plurality of radiating elements configured in a common array aperture of m×n elements, said system comprising:

a controller for configuring a first subset of said elements of said common array aperture into a first sub-aperture for providing a first interrogating beam; and a second subset of said elements of said common array aperture distinct from said first subset, into a second sub-aperture for providing a second interrogating beam;

a pair of transmitters, each one coupled to a corresponding one of said first and second sub-arrays and responsive to said controller in a first mode for simultaneously generating said first and second interrogating beams, said beams being independently steerable;

a pair of receiver beamformers, each one coupled to a corresponding one of said first and second sub-arrays for providing beamformed output data indicative of target reflections from each of said first and second interrogating beams;

a signal processor arrangement responsive to said beamformed output data for determining target detection and tracking according to each said sub-array; wherein said controller is operable for providing in said first mode a signal waveform to said pair of transmitters differing in at least one of frequency, phase, and pointing direction to generate said first and second interrogating beams; and wherein said controller is operable for providing in a second mode a signal waveform to said pair of transmitters of the same frequency, phase, and beam pointing direction such that the interrogating beams are coherently combined into a single narrowband beam output from said subarrays and corresponding to the full array aperture.

6. The system of claim 5, wherein the signal processor arrangement comprises a pair of digital signal processors, each coupled to a corresponding one of said pair of beamformers.

7. The system of claim 6, wherein said first sub-aperture is about one half of said common array aperture, and wherein beamforming data received by said pair of digital signal processors is coherently combined for determining target detection and tracking in said second mode.

8. The system of claim 6, wherein in said first mode, said signal waveform comprises a pulse width of about 1 to 10 microseconds and a pulse repetition interval of about 40 to 100 microseconds.

9. In a phased array radar system having a plurality of radiating elements configured in a common array aperture of m×n elements, a method for detecting and tracking targets comprising;

electronically separating said common array aperture of m×n elements into a first sub-aperture comprising a first subset of said m×n elements defining a first sub-array, and a second sub-aperture comprising a second subset of said m×n elements distinct from said first subset defining a second sub-array;

in a first mode, generating a first interrogating beam of a first frequency from said first sub-array and a second interrogating beam of a second frequency from said second sub-array, said first and second interrogating beams differing in at least one of frequency, phase, and beam pointing direction; independently steering said first and second interrogating beams; receiving beamformed data from each of said first and second sub-apertures corresponding to said interrogating beams, and independently processing said beamformed data to provide target information for each of said first and second sub-apertures;

in a second mode, coherently operating said first and second sub-arrays to generate a narrowband interrogating beam of a given frequency corresponding to the full common array aperture; receiving beamformed data from each of said first and second sub-apertures corresponding to said narrowband interrogating beam, and combining said beamformed data to provide target information indicative of the full common array aperture.

10. The method of claim 9, wherein said first sub-aperture is about one half of said common aperture.

11. The method of claim 9, wherein said generating said first and second interrogating beams comprises providing a pulse waveform differing in at least one of frequency, phase, and pointing direction, to corresponding first and second transmitters in communication with said respective subapertures, and wherein said generating said narrowband interrogating beam comprises providing a pulse waveform of the same frequency, phase, and pointing direction, to corresponding first and second transmitters in communication with said respective subapertures.

* * * * *

UNITED STATES PATENT AND TRADEMARK OFFICE
CERTIFICATE OF CORRECTION

PATENT NO. : 7,423,578 B1 Page 1 of 1
APPLICATION NO. : 11/450498
DATED : September 9, 2008
INVENTOR(S) : Byron W. Tietjen It is certified that error appears in the above-identified patent and that said Letters Patent is hereby corrected as shown below:

Column 9:
Claim 1, line 13, insert the word in after "wherein" to change to --wherein in--
Claim 3, line 3, delete the words "short range"

Signed and Sealed this

Twenty-third Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,423,578 B1  Page 1 of 1
APPLICATION NO. : 11/450498
DATED : September 9, 2008
INVENTOR(S) : Byron W. Tietjen It is certified that error appears in the above-identified patent and that said Letters Patent is hereby corrected as shown below:

Column 9:
Claim 1, line 17, insert the word in after "wherein" to change to --wherein in--
Claim 3, line 33, delete the words "short range"

This certificate supersedes the Certificate of Correction issued December 23, 2008.

Signed and Sealed this

Twenty-seventh Day of January, 2009

JOHN DOLL
*Acting Director of the United States Patent and Trademark Office*